US011475287B2

(12) United States Patent
Rosemarine

(10) Patent No.: US 11,475,287 B2
(45) Date of Patent: Oct. 18, 2022

(54) MANAGING CONTROL DATA

(71) Applicant: Arm Limited, Cambridge (GB)

(72) Inventor: Elliot Maurice Simon Rosemarine, Cambridge (GB)

(73) Assignee: Arm Limited, Cambridge (GB)

( * ) Notice: Subject to any disclaimer, the term of this patent is extended or adjusted under 35 U.S.C. 154(b) by 736 days.

(21) Appl. No.: 16/508,912

(22) Filed: Jul. 11, 2019

(65) Prior Publication Data

US 2021/0012185 A1    Jan. 14, 2021

(51) Int. Cl.
| | |
|---|---|
| *G06F 3/06* | (2006.01) |
| *G06F 9/30* | (2018.01) |
| *G06N 3/063* | (2006.01) |
| *G06K 9/62* | (2022.01) |
| *G06F 13/16* | (2006.01) |

(52) U.S. Cl.
CPC ......... *G06N 3/0635* (2013.01); *G06F 9/3012* (2013.01); *G06F 9/30101* (2013.01); *G06F 13/1663* (2013.01); *G06K 9/6217* (2013.01)

(58) Field of Classification Search
None
See application file for complete search history.

(56) References Cited

U.S. PATENT DOCUMENTS

2020/0125937 A1*    4/2020    Liu ........................ G06N 3/08

* cited by examiner

*Primary Examiner* — Scott C Sun
(74) *Attorney, Agent, or Firm* — EIP US LLP

(57) ABSTRACT

There is provided a neural processing unit (NPU), including a primary processing node containing primary control registers and processing circuitry configured to write control data to the primary control registers, and multiple secondary processing nodes each having respective secondary control registers and being configured to process data in accordance with control data stored by the respective secondary control registers. The NPU also includes a bus interface for transmitting data between the primary processing node and the plurality of secondary processing nodes. The primary processing node is configured to transmit first control data to a given secondary control register of each of the plurality of secondary processing nodes.

20 Claims, 6 Drawing Sheets

MANAGING CONTROL DATA

BACKGROUND OF THE INVENTION

Field of the Invention

The present disclosure relates to methods and apparatus for managing control data in a data processing system. The disclosure has particular, but not exclusive, relevance to the management of control data within a neural processing unit (NPU).

Description of the Related Technology

Neural processing units (NPUs), also referred to as neural network accelerators or artificial intelligence accelerators, are specialized electronic circuits designed to process input data in accordance with specified neural network architectures. NPUs are typically arranged to exploit the structure of neural networks by processing input data across multiple processing nodes in parallel.

In order to process data in accordance with a given neural network architecture, for example a convolutional neural network (CNN) architecture, processing nodes within an NPU must frequently access control data to enable the processing nodes to co-ordinate and remain synchronized with one another when working on a given layer of the network. It is desirable for an NPU to have flexibility to deal with a broad range of neural network architectures in an efficient manner, including architectures that have not been anticipated at the time of manufacture of the NPU.

SUMMARY

According to a first aspect, there is provided a neural processing unit (NPU), containing a primary processing node with primary control registers and processing circuitry configured to write control data to the primary control registers, and multiple secondary processing nodes each having respective secondary control registers and being configured to process data in accordance with control data stored by the respective secondary control registers. The NPU also includes a bus interface for transmitting data between the primary processing node and the plurality of secondary processing nodes. The primary processing node is configured to transmit first control data to a given secondary control register of each of the plurality of secondary processing nodes.

Further features and advantages will become apparent from the following description of preferred embodiments, given by way of example only, which is made with reference to the accompanying drawings.

DETAILED DESCRIPTION OF CERTAIN INVENTIVE EMBODIMENTS

Details of systems and methods according to examples will become apparent from the following description with reference to the figures. In this description, for the purposes of explanation, numerous specific details of certain examples are set forth. Reference in the specification to 'an example' or similar language means that a feature, structure, or characteristic described in connection with the example is included in at least that one example but not necessarily in other examples. It should be further notes that certain examples are described schematically with certain features omitted and/or necessarily simplified for the ease of explanation and understanding of the concepts underlying the examples.

Figure 1:
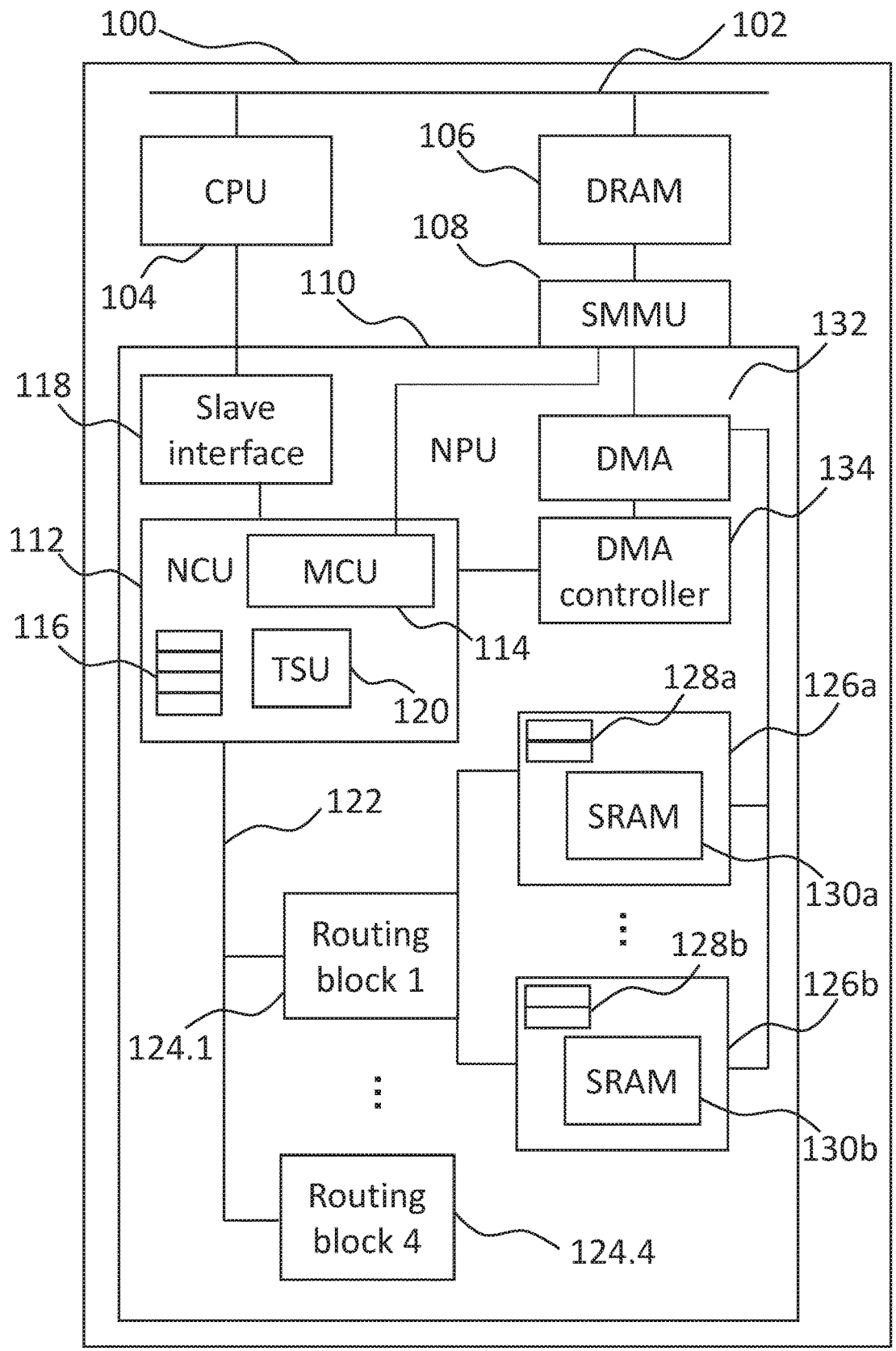
FIG. 1 is a schematic block diagram showing a computer system arranged in accordance with an embodiment of the present invention.

FIG. 1 shows an example of a computer system 100 arranged in accordance with an embodiment of the present invention. The computer system 100 includes a system bus 102 connected to a central processing unit (CPU) 104, dynamic random-access memory (DRAM) 106, and a system memory management unit (SMMU) 108. The SMMU 108 is responsible for managing storage of, and access to, data stored by the DRAM 106, including virtualizing memory requests. The system bus 102 may also be connected to other components not shown in FIG. 1, for example non-volatile storage, input/output devices, a graphics processing unit (GPU), and one or more network interfaces. The computer system 100 also includes a neural processing unit (NPU) 110, which is a specialized circuit for processing data in accordance with a range of neural network architectures, for example convolutional neural network (CNN) architectures.

The NPU 110 includes a neural control unit (NCU) 112, which is a primary processing node arranged to generate control data for multiple secondary processing nodes, referred to collectively as computation engines 126. Two of the computation engines, 126a and 126b, are shown in FIG. 1. In the present example, the NPU 110 includes sixteen computation engines 126, though it will be appreciated that different numbers of computation engines could be employed without departing from the scope of the invention. The NCU 112 includes a microcontroller unit (MCU) 114 and a primary register array containing 32-bit primary control registers 116. The MCU 114 is configured to read control data from the primary control registers 116 and to write control data to the primary control registers 116, and also to read data and instructions from the DRAM 106 via the SMMU 108. Furthermore, the CPU 104 can access a subset of the primary control registers 116 via a slave interface 118. The NCU 112 includes a traversal and synchronization unit (TSU) 120, which is a hardware component configured to generate control data used to coordinate the processing of input data by the computation engines 126, as will be explained in more detail hereafter. The MCU 114 controls the TSU 120 by writing control data to the primary control registers 116.

The NCU 112 and the computation engines 126 are connected by a bus interface 122, such that data can be transferred between the NCU 112 and the computation engines 126. In the present example, the bus interface 122 is a shared bus that transmits address signals and data signals on alternate clock cycles, and employs bus logic to route the data signals to memory locations specified by the address signals. By transmitting address signals and data signals on the same bus, as opposed to providing a separate data bus and address bus, the number of wires required within the bus interface 122 is halved. It will be appreciated, however, that in other examples a bus interface may include a separate address bus and data bus. In this example, the bus interface 122 includes four routing blocks 124.1, 124.2, 124.3, and 124.4, referred to collectively as routing blocks 124. Each of the routing blocks 124 is arranged to route data signals between the NCU 112, the other routing blocks 124, and a subset of the computation engines 126. The routing blocks 124 in this example are able to temporarily store data for forwarding to other components of the NPU 110, but do not perform any further data processing functions. Providing routing blocks as shown, as opposed to point-to-point connections between the NCU 112 and the computation engines 126, significantly reduces the number of wires running from the NCU 112. In the present example, each of the routing blocks 124 is connected directly to four of the computation engines 126, as well as the other three routing blocks 124. It will be appreciated that different arrangements are possible without departing from the scope of the invention.

Each of the computation engines 126 includes a secondary register array containing 32-bit secondary control registers 128, which includes duplications of a subset of the primary control registers 116, as will be explained in more detail hereafter. Each of the computation engines 126 further includes static random-access memory (SRAM) 130. The computation engines 126 are configured to process data stored by the SRAM 130 in accordance with control data stored by the secondary control registers 128. Further details on the arrangement and functionality of the secondary control registers 128 will be described hereafter.

The NPU 110 includes a direct memory access (DMA) 132 that retrieves data from the DRAM 106 under instruction from a DMA controller 134, in accordance with control data stored by the primary control registers 116. The DMA 132 is arranged to transfer data from the DRAM 106 to the SRAM 130 of the computation engines 126. The data transferred by the DMA 132 can include, for example, image data or input feature map (IFM) data, along with weight data associated with filters or kernels to be applied within a given CNN layer.

Figure 2:
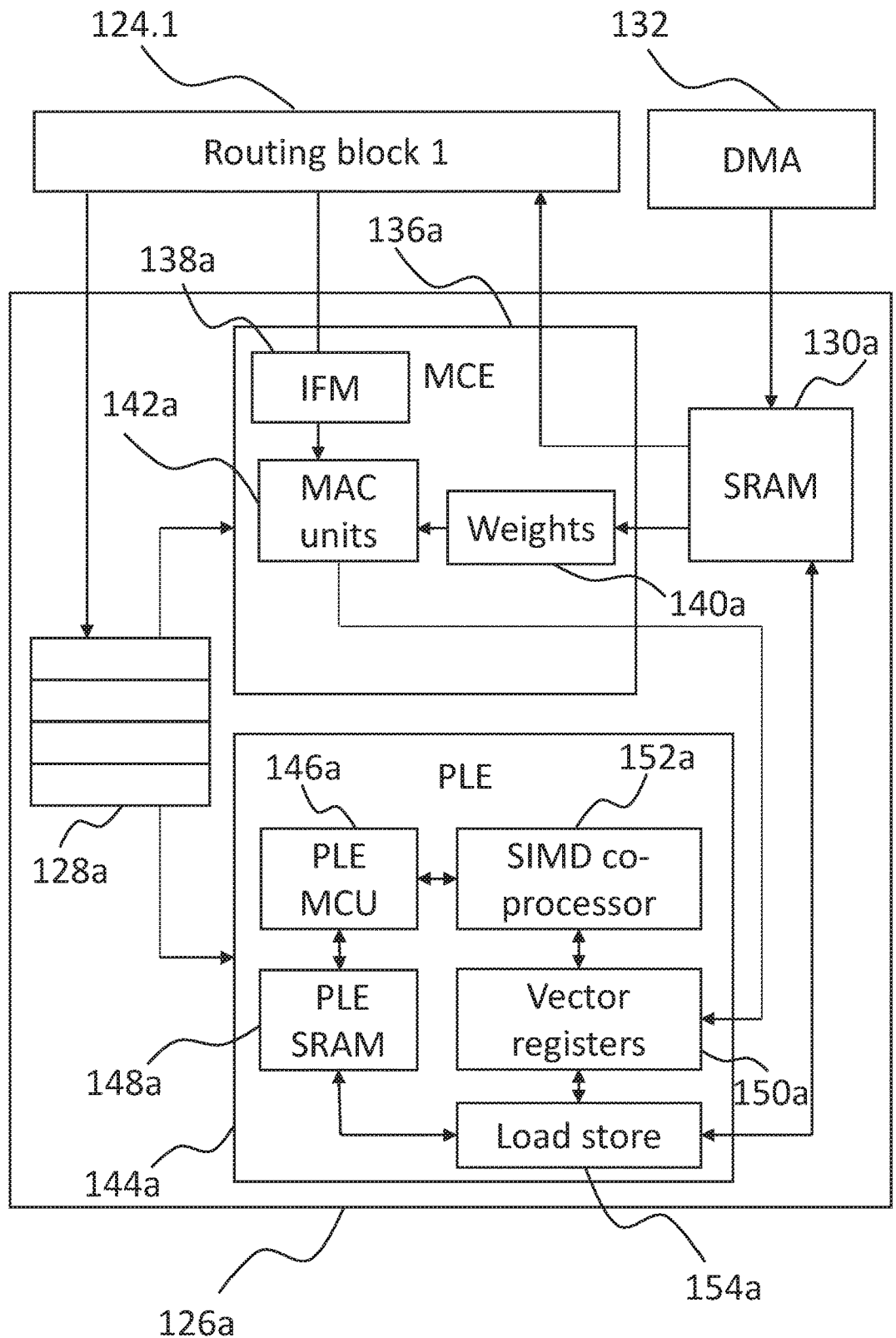
FIG. 2 is a schematic block diagram showing a computation engine within a neural processing unit (NPU) of the computer system of FIG. 1.

FIG. 2 shows the computation engine 126a in more detail. In the present example, the computation engines 126b, c, . . . include substantially the same components as the computation engine 126a. In addition to the secondary control registers 128a and the SRAM 130a mentioned above, the computation engine 126a includes a multiply-accumulate (MAC) computation engine (MCE) 136a, which is arranged to process data received from the SRAM 130 of the computation engines 126 in accordance with control data stored by the secondary control registers 128a. The MCE 136a includes an input feature map (IFM) buffer 138a and a weights buffer 140a for passing IFM data and weights data from to the MAC units 142a. The MAC units 142a are configured to process IFM data and weights data using MAC operations to generate output feature map (OFM) data. In the context of a CNN, the MCEs 136 are responsible for implementing a convolution within a convolutional layer of the CNN.

In the present example, the MCE 136a is arranged to output OFM data to a programmable layer engine (PLE) 144a. The PLE 144a is arranged to perform additional processing operations on OFM data generated by the MCE 136a, including, for example, pooling operations and applying activation functions. The PLE 144a can be programmed to perform different operations for different layers within a given CNN, allowing for a broad range of CNN architectures to be implemented. Accordingly, the PLE 144a includes a PLE MCU 146a, which is arranged to run program data stored by PLE SRAM 148a in accordance with control data stored by the secondary control registers 128a. The PLE 144a further includes a vector register array containing 128-bit vector registers 150a. The vector registers are arranged to receive OFM data directly from the MAC units 142a, such that additional processing operations can be performed on the OFM data without the need for further accesses to SRAM or any other memory. The PLE 144a includes a single instruction, multiple data (SIMD) coprocessor, which is configured to read OFM data from one or more of the vector registers 150a, perform vector operations on the OFM data, and write the processed OFM data back to the vector registers 150a, in accordance with instructions received from PLE MCU 146a. In comparison to scalar operations (in which the operands are single data words) vector operations (in which the operands are multiple data words) increase the quantity of data processed in each clock cycle, resulting in faster processing of the OFM data. The PLE 144a includes a load store 154a, which is arranged to transfer data in an efficient manner between the SRAM 130a, the vector registers 150a, and the PLE SRAM 148a.

As described above, the PLE 144a is arranged to perform additional processing operations on OFM data generated by the MCE 136a. The PLE 144a is arranged to output the processed OFM data, via the load sore 154a, to the SRAM 130a of the computation engine 126a. In the context of a CNN, the processed OFM data becomes IFM data for the next layer in the CNN, which may be, for example, a further convolutional layer or a fully connected layer. The processed OFM data may be broadcast to the other computation engines 126 via the routing block 124.1 as IFM data for a further layer of the CNN, or may be output to the DRAM 106.

Figure 3:
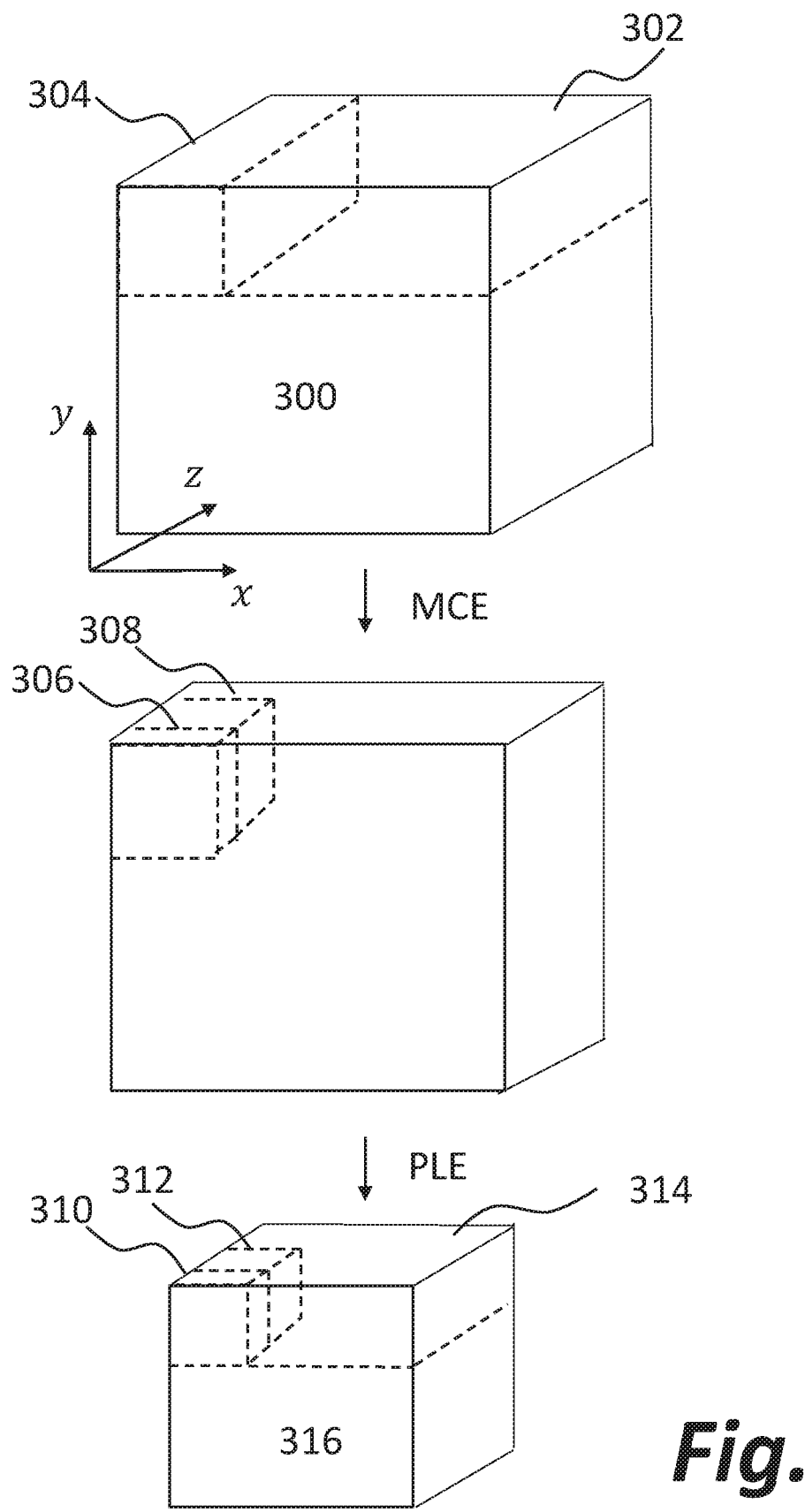
FIG. 3 shows schematically an input feature map (IFM) being processed within a layer of a convolutional neural network (CNN).

FIG. 3 shows an illustrative example IFM 300 being processed by the NPU 110 within a layer of a CNN. In this example, IFM 300 has in-plane dimensions in the xy plane and a depth dimension in the z direction. For processing by the NPU 110, the IFM 300 is divided into subregions referred to as stripes, which in the present example each span the full width of the IFM 300 in the x direction, the full depth of the IFM 300 in the z direction, and part of the height of the IFM 300 in the y direction. It should be appreciated that this definition of a stripe is illustrative only, and other arrangements are possible. For example, a stripe may include only a part of the width of an IFM. In FIG. 3, the stripe 302 corresponds to the portion of the IFM 300 above the dashed horizontal line. Prior to processing of the stripe 302, the stripe 302 is stored across the SRAM 130 of all of the computation engines 126. During processing, each of the computation engines 126 requires access to the entire stripe 302, and therefore portions of the stripe 302 are broadcast via the routing blocks 124 to the respective MAC units 142 of the computation engines 126. The DRAM 106 loads respective weight data to the SRAM 130 of each of the computation engines 126, corresponding to a kernel or filter to be applied by that computation engine. The MCEs 136 simultaneously process a portion 304 of the stripe 302, using respective different weight data, to generate slices of OFM data. In the example of FIG. 3, the MCE 136a processes the portion 304 to generate a 16×16×1 slice 306 of OFM data (where the in-plane size of the slice 306 is limited by the number of MAC units 142 in each computation engine 126).

The computation engines 126 independently generate slices of OFM data from the portion 304 of the stripe 302 and respective different weight data, where the slices correspond to OFM data at different depths. In the present example, the sixteen computation engines 126 together generate a 16×16×16 OFM block 308 in a single computation cycle (which may include one or more clock cycles of the computer system 100). In the CNN layer depicted in FIG. 3, more than 16 kernels are applied in total, and the depth of the OFM block 308 is therefore less than the full depth of the OFM data to be computed. In order to compute the full depth of OFM data, at least some of the computation engines 126a compute slices of a further OFM block at the same in-plane position as the OFM block 308.

The slice 306 of OFM data generated by the MCE 136a is output to the vector registers 150a of the PLE 144a, and the PLE 144a performs further processing operations including applying an activation function (for example, a rectified linear unit (ReLU) activation function) and, for the present CNN layer, applying 2×2 max pooling. Passing slices of OFM data directly from the MCEs to the PLEs of the computation engines 126 reduces the number of accesses to SRAM, improving the efficiency and speed of data processing. As mentioned above, the PLE 144a is dynamically programmed such that the PLE 144a can perform different processing operations for different CNN layers. The PLE 144a generates a slice 310 of processed OFM data, which is passed to the SRAM 130a of the computation engine 126a. The sixteen slices of OFM data in the OFM block 308 are processed simultaneously by the PLEs 144, resulting in a block 312 of processed OFM data. The computation engines 126 generate further blocks, traversing in the in-plane and out-of-plane directions as necessary until an entire stripe 314 of processed OFM data has been generated. The stripe 314 becomes a stripe of IFM 316 to be processed by the next CNN layer. Different portions of the stripe 314 are stored at different computation engines 126, and may either be broadcast between the computation engines 126 via the routing blocks 124 as they are processed by the next CNN layer, or may be passed back to the DRAM 106. In some examples, multiple CNN layers may be implemented for a single stripe before progressing to a new stripe, minimizing the number of DRAM accesses required for storage of intermediate stripe data. In other examples, an entire IFM may be processed by a single CNN layer before moving to the next CNN layer, minimizing the number of DRAM accesses required to retrieve weight data.

In the example described above with reference to FIG. 3, the computation engines 126 compute slices of OFM data with corresponding in-plane co-ordinates. Although the computation engines 126 store different slices of IFM data, and compute different slices of OFM data, in the configuration described above, other aspects of the processing performed by the computation engines 126 within a given CNN layer are often identical. The processing of IFM data within a given CNN layer is performed in accordance with control data stored by the secondary control registers 128 of the computation engines 126. According to the present invention, the NCU 112 is configured to transmit identical control data to a given secondary control register of each of the computation engines 126. For example, instead of sending different control data to the different computation engines 126 to indicate z positions of IFM slices to be broadcast and z positions of OFM slices to be computed within a given cycle, using the present arrangement identical control data is transmitted to all of the computation engines 126, indicating a range of z positions corresponding to a OFM block. The computation engines 126 are allocated a predetermined order, and given the control data for the block, are therefore able to determine which IFM slices to broadcast, and/or which OFM slice to compute, during a given clock cycle. The present method thereby reduces overheads of the NPU 110, as fewer control data updates are required, and it is not necessary for the MCU 114 to track which IFM slices and OFM slices the individual computation engines 126 are responsible for. As will be described in more detail hereafter, some of the control data transmitted to all of the computation engines 126 is valid for an entire CNN layer. Other control data is specific to a stripe of IFM data, whilst still other control data is specific to a block of OFM data. In any of these cases, the same control data is transmitted to each of the computation engines 126.

In addition to certain control data being required by all of the computation engines 126, the same control data may also need to be accessed at the NCU 112, for example by the TSU 120. The TSU 120 is responsible for determining how a stripe of IFM data should be traversed in the in-plane and out-of-plane directions to generate blocks of OFM data, and for synchronizing the computation engines 126 to enable parallel processing of the stripe. In order for the TSU 120 to be able to access control data shared by the computation engines 126, under certain circumstances the MCU 114 is configured to write control data to the primary control registers 116 when the same control data is transmitted to the secondary control registers 128 of the computation engines 126. The components of the NCU 112 are thereby able to access the control data shared by the computation engines 126 as necessary, without the need for data to be transferred from the computation engines 126 to the NCU 112 over the bus interface 122.

For a conventional bus interface, data signals are transmitted in association with an address signal indicating a destination address of a memory location to which the data is to be written. Bus logic interprets the address signal and uses this to route the data signal to the correct memory location. For a system arranged in accordance with the present invention, in which a primary processing node is arranged to transmit first control data to secondary control registers of multiple secondary processing nodes, using conventional bus logic as described above requires a separate data signal, along with a separate address signal, to be transmitted for each of the secondary control registers to which the control data is to be transmitted. The NPU 110 of FIG. 1 utilizes a novel alternative implementation, in which the bus interface 122 is adapted using customized interconnect fabric and bus logic to create a broadcast mechanism, allowing control data to be transmitted simultaneously to given secondary control registers 128 of the secondary processing nodes 126, using only a single address signal. The bus interface 122 may, for example, broadcast data to a given secondary control register of each of the secondary processing nodes 126 when the MCU 114 writes control data to a corresponding primary control register 116.

Figure 4:
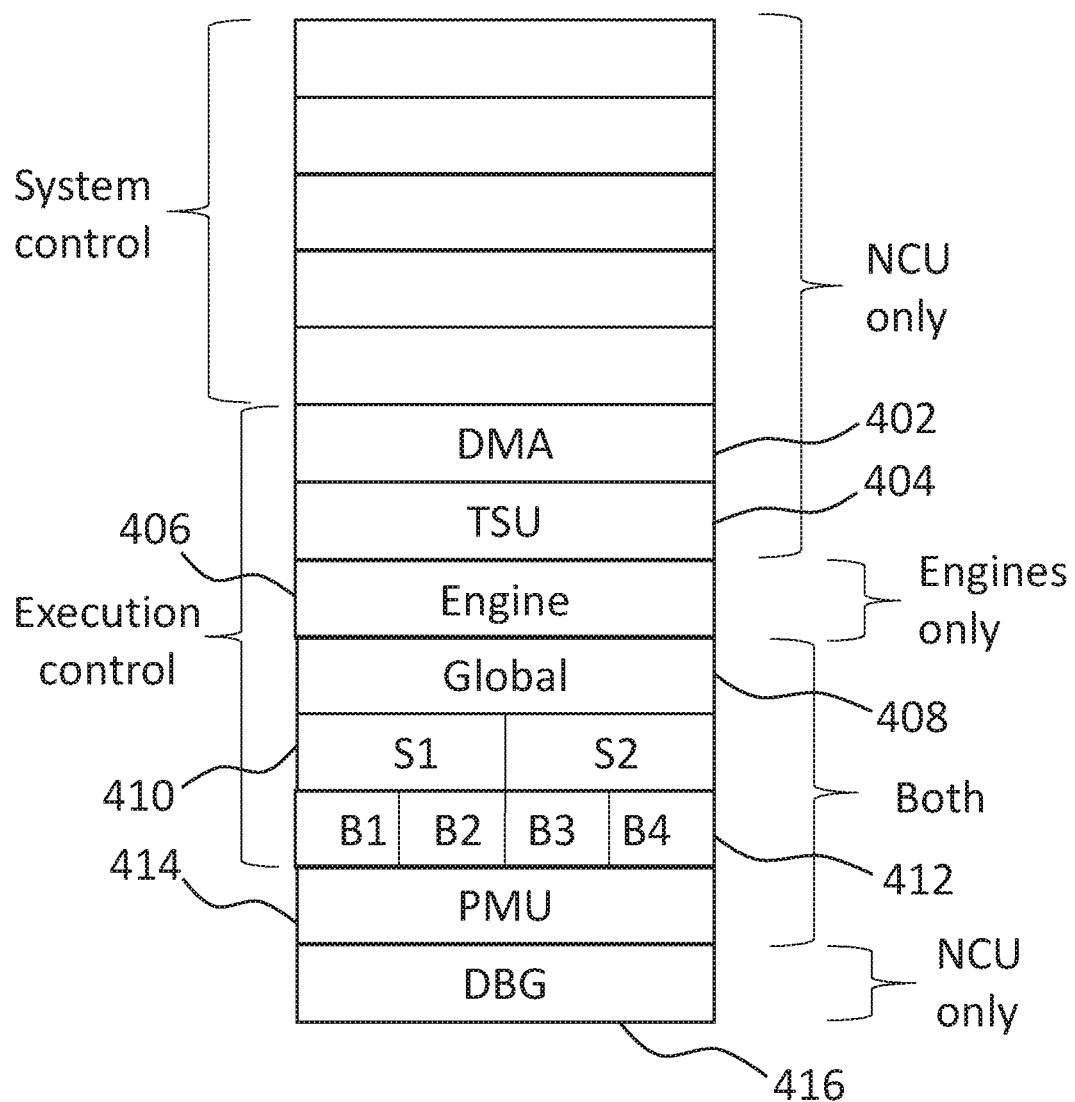
FIG. 4 is a schematic block diagram showing register pages arranged in accordance with an embodiment of the present invention.

FIG. 4 shows schematically the arrangement of the primary control registers 116 and the secondary control registers 128 in the NPU 110 of FIG. 1. The primary and secondary control registers are arranged in register pages, most of which are grouped in two main page groups: system control and execution control. Each of the page groups includes multiple register pages. Some of the register pages exist only at the NCU 112, others exist only at the computation engines 126, and still others exist both within at NCU 112 and at the computation engines 126. Control registers within the system control register pages exist only within the NCU 112, and can be accessed by the MCU 114, and by the host CPU 104 via the slave interface 118. The system control register pages will not be described in further detail in the present application.

The execution control page group includes control registers used to coordinate components of the NPU 110 during data processing. The execution control page group includes a DMA register page 402, which contains control registers used to indicate data locations within the DRAM 106 from which data (for example, image data, IFM data, weight data) is to be retrieved by the DMA 132. The execution control page groups also includes a TSU register page 404, which contains control registers used, for example, to signal to the TSU 120 when various processing tasks have been completed, such as the processing of a block or a stripe by the MCEs 136 and/or the PLEs 144. The DMA register page 402 and the TSU register page 404 exist only within the NCU 112.

The execution control page group includes an engine-specific register page 406, which contains control registers that are used by components of the computation engines 126, but are not required at the NCU 112. Control registers in the engine-specific register page 406 are used, for example, by the PLEs 144 to retrieve program data required for a given CNN layer. The engine-specific register page 406 exists only within the computation engines 126.

The execution control page group includes a global register page 408, which contains control registers that are generally not updated during processing of IFM data. Control registers in the global register page 408 are used, for example, to set register bank configurations, as will be described in more detail hereafter. The global register page exists both within the NCU 112 and within each of the computation engines 126.

The execution control page group includes a stripe-specific register page 410, which contains control registers that are accessed by the TSU 120 and the computation engines 126, and are used, for example, to specify stripe size, padding configuration and kernel configuration for an IFM stripe. The stripe-specific register page 410 exists both within the NCU 112 and within each of the computation engines 126. The execution control page group also includes a block-specific register page 412, which contains control registers that are accessed by the TSU 120 and the computation engines 126, and is used, for example, to specify dimensions of a block, the location of a block within a given OFM, and whether a block is the first or last block in a given stripe and/or OFM. In the present example, control data for the block-specific register page is generated by the TSU 120. As discussed above, transmitting identical block-specific control data to each of the computation engines 126, as opposed to different slice-specific control data, reduces overheads and improves the efficiency of computing OFM data. The stripe-specific register pages exist both within the NCU 112 and within each of the computation engines 126.

Even using the broadcast mechanism described above, transmitting all of the necessary stripe-specific control data for a given stripe to the secondary control registers 116 of the computation engines 126 generally involves multiple clock cycles. Therefore, updating the stripe-specific control data as the computation engines 126 progress from one stripe to the next could result in a delay in data processing. To avoid such delays, the control registers in the stripe-specific register page 410 are arranged in two register banks S1 and S2. The first register bank S1 contains duplicates of the control registers stored in the second register bank S2. The duplicate control registers are assigned identical memory addresses, and hardware components of the NCU 112 and computation engines 126 are arranged to route control data automatically to the appropriate register bank S1 or S2 depending on current use states of the register banks. Using this arrangement, second control data, relating to a second IFM stripe, can be written to the control registers of the respective second register banks S2 whilst the computation engines 126 process data in accordance with first control data, relating to a first IFM stripe, stored in the control registers of the respective first register banks S1, and vice versa. When the computation engines 126 are ready to progress from one stripe to the next, the computation engines 126 switch the active register bank from the first register bank S1 to the second register bank S2, and start processing IFM data in accordance with control data stored by the second register bank S2.

In the present example, the control registers in the block-specific register page 412 are arranged in four register banks B1-B4. In a similar manner to that described above for the stripe-specific register pages, second, third, and fourth control data can be written to the control registers of the register banks B2-B4 whilst the computation engines 126 process data in accordance with first control data stored in the control registers of the first register bank B1. Block-specific control data is updated more frequently than stripe-specific control data, and therefore in the present arrangement, to avoid delays in data processing, more register banks are pre-loaded with block-specific control data than are pre-loaded with stripe-specific control data.

For register pages in the execution control page group (apart from those belonging to the DMA register page 402 and the TSU register page 404), during normal operation of the NPU 110, the NCU 112 transmits identical control data to secondary control registers of each of the computation engines 126. In the present example, this is achieved via a broadcast mechanism, ensuring the computation engines 126 are coordinated and remain in sync with one another. For register pages that exist both within the NCU 112 and the computation engines 126, the same control data is also written to corresponding primary control registers 116.

As described above, broadcasting of control data to secondary control registers may be enabled for register pages in the execution control register page group. By contrast, broadcasting of control data is disabled for secondary control registers in a performance monitoring unit (PMU) register page 414, which contains control registers used to measure the performance of the computation engines 126. The performance of each of the computation engines 126 is measured on an individual basis, and thus for the control registers within the PMU register page 414, the bus interface 122 is configured to selectively transmit control data to the individual computation engines 126, as opposed to broadcasting control data to all of the computation engines 126. The register pages shown in FIG. 4 also include a debug register page 416, which exists only within the NCU 122, and will not be described in detail herein.

As discussed above, for certain register pages, during normal operation of the NPU 110, the bus interface 122 broadcasts control data to secondary control registers of the computation engines 126. For additional flexibility, in the present example the bus interface 122 is adapted to broadcast control data to the secondary control registers only when the control data is sent in association with an indicator set to a first state. When the indicator is set to a second state, the bus interface selectively transmits control data to a secondary control register of a specified computation engine 126. Providing the functionality for control data to be selectively transmitted to a specified computation engine 126 improves the capability of the NPU 110 to handle unexpected use cases, and may also be useful, for example, to implement custom debug mechanisms.

Figures 5, 6:
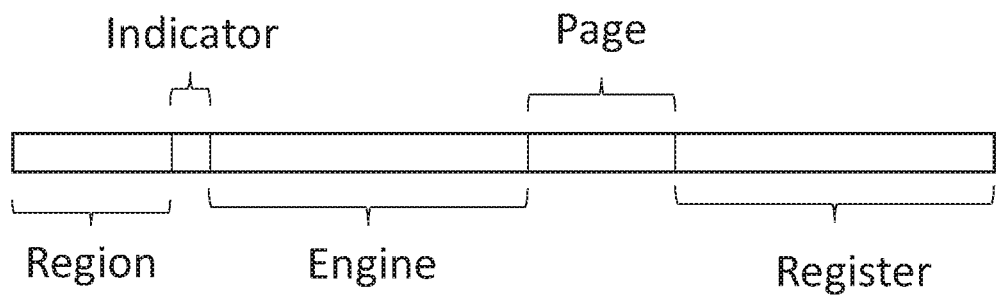
FIG. 5 is a schematic block diagram showing a memory address space in accordance with an embodiment of the present invention.
FIG. 6 is a table representing a method of managing control data in accordance with an embodiment of the present invention.

In the present example, the MCU 114 transmits control data in association with a binary indicator bit having two possible states. In the present example, the indictor bit is embedded within a 32-bit memory address space of the control registers. FIG. 5 shows schematically the memory address space of the control registers. The memory address space includes a first portion specifying the memory region. In the present example, all of the control registers are located in the same memory region, which is distinguished from other memory regions such as the SRAM 130 or the PLE SRAM 144 of the computation engines 126. The memory address space includes a second portion for specifying one of the computation engines 126. For control registers existing only within the NCU 112, this second portion is unused. The second portion is also unused when the bus interface operates in broadcast mode. The memory address space includes a third portion for specifying a register page, and a fourth portion for specifying a control register within the specified register page. For corresponding control registers in different computation engines 126, only the second memory address portion varies. Furthermore, duplicate control registers in a given register bank share identical memory addresses.

As shown in FIG. 5, the memory address space in this example includes an indicator bit embedded between the first and second address portions mentioned above. The indicator bit is set by the MCU 114 when the MCU 114 transmits control data to the control registers, and is read by bus logic of the bus interface 122 to determine whether to broadcast the control data or to selectively transmit the control data to a specific computation engine. It will be appreciated that the memory address space shown in FIG. 5 is only an example, and other arrangements are possible without departing from the scope of the invention.

FIG. 6 shows the effect of setting the state of the indicator bit to different values when writing data to control registers in the execution control page group. For register pages existing only at the NCU 112, the indicator bit must be set to 1 for control data to be successfully written to a primary control register. Setting the indicator to 0 for a register page existing only at the NCU 112 results in an error message being returned. For register pages existing only at the computation engines 126, setting the indicator bit to 0 results in control data being selectively transmitted and written to a secondary control register of a specified computation engine. Setting the indicator bit to 1 results in control data being broadcast to all of the secondary computation engines 126, irrespective of the address portion specifying a specific computation engine. For register pages existing both within the NCU 112 and the computation engines 126, setting the indicator bit to 0 results in data being selectively transmitted and written to a secondary control register of a specified computation engine. Setting the indicator bit to 1 results in data being broadcast to all of the secondary computation engines 126, and also written to a corresponding primary control register, irrespective of the address portion specifying a specific computation engine. In any case, when the indicator bit is set to 1, the portion of the memory address for specifying a computation engine 126 is disregarded.

Figure 7:
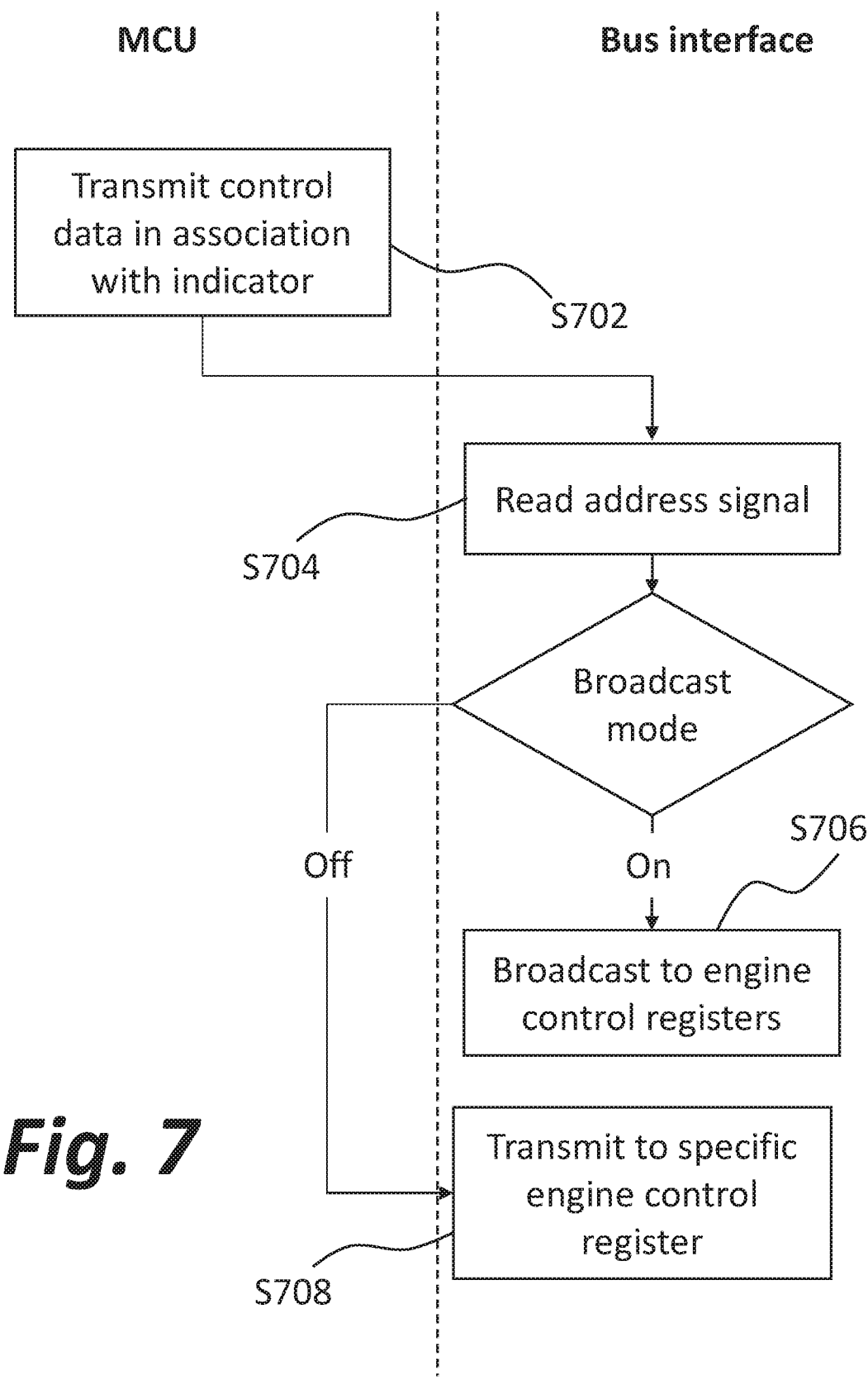
FIG. 7 is a flow diagram representing a method of managing control data in accordance with an embodiment of the present invention.

FIG. 7 shows an example method performed by the NPU 110 to manage control data in accordance with the present invention. The MCU 114 transmits, at S702, first control data to the bus interface 122 in association with an address signal containing an indicator bit set to either a first state or a second state. The bus interface reads, at S704, the address signal and determines the state of the indicator bit. If the state of the indicator bit indicates that broadcast mode is enabled, the bus interface 122 broadcasts, at S706, the first control data to a given control register of each of the computation engines 126. If the state of the indicator bit indicates that broadcast mode is not enabled, the bus interface 122 selectively transmits, at S708, the first control data to a given control register of a computation engine specified in the address signal.

The above examples are to be understood as illustrative examples of the present disclosure. Further examples are envisaged. For example, a broadcast mechanism could be implemented for one or more subsets of secondary processing nodes in an NPU, for example using additional indicator states to indicate different subsets of the secondary processing nodes. Similar methods for handing control data to those described herein could be used in other specialized circuits, such as GPUs. The specific hardware arrangements described herein are examples only. In other examples, a secondary processing node may be arranged differently, and may for example not include separate MCEs and PLEs. In some examples, an NPU may include a multi-level hierarchy of nodes, for example including tertiary processing nodes which receive control data from secondary processing nodes in accordance with methods described herein. It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the disclosure, which is defined in the accompanying claims.

What is claimed is:

1. A neural processing unit (NPU) comprising:
   a primary processing node comprising primary control registers and processing circuitry configured to write control data to the primary control registers;
   a plurality of secondary processing nodes each comprising respective secondary control registers and being configured to process data in accordance with control data stored by the respective secondary control registers; and
   a bus interface for transmitting data between the primary processing node and the plurality of secondary processing nodes,
   wherein the primary processing node is configured to transmit first control data to a given secondary control register of each of the plurality of secondary processing nodes.

2. The NPU of claim 1, wherein the bus interface is adapted to broadcast the first control data to the given secondary control registers.

3. The NPU of claim 2, wherein the bus interface is adapted to broadcast the first control data to the given secondary control registers in response to the processing circuitry setting an indicator to a first state.

4. The NPU of claim 3, wherein the indicator comprises an indicator bit transmitted by the processing circuitry in association with the first control data.

5. The NPU of claim 4, wherein the indicator bit is embedded within a memory address space of the primary or secondary control registers.

6. The NPU of claim 3, wherein the bus interface is adapted to selectively transmit second control data to a secondary control register of one of the secondary processing nodes in response to the processing circuitry setting the indicator to a second state.

7. The NPU of claim 6, wherein the bus interface is adapted to broadcast third control data to a secondary control register of each of a subset of the secondary processing nodes in response to the processing circuitry setting the indicator to a third state.

8. The NPU of claim 1, wherein the processing circuitry is configured to write the first control data to a corresponding primary control register of the primary processing node when the first control data is transmitted to the given secondary control registers.

9. The NPU of claim 1, wherein the given secondary control registers share a common address portion within a memory address space.

10. The NPU of claim 1, wherein:
the secondary control registers are arranged in register pages;
the given secondary control register of each secondary processing node is contained within a respective first register page; and
broadcasting of control data from the primary processing node to secondary control registers is enabled for the respective first register page of each secondary processing node and disabled for at least one other register page of each secondary processing node.

11. The NPU of claim 1, wherein:
the given secondary control register of each secondary processing node is contained within a respective first register bank comprising a plurality of secondary control registers;
the primary processing node is configured to transmit second control data to a further secondary control register within a respective second register bank of each secondary processing node while said secondary processing node processes data in accordance with the first control data;
the transmitting of the first control data to the given secondary control registers comprises the secondary processing nodes routing the first control data to the respective first register banks; and
the transmitting of the second control data to the further secondary control registers comprises the secondary processing nodes routing the second control data to the respective second register banks.

12. The NPU of claim 1, wherein the secondary processing nodes are configured to simultaneously process a portion of an input feature map in accordance with the first control data to generate respective different portions of an output feature map, the respective different portions corresponding to respective different depth slices of the output feature map.

13. A method of processing data by a neural processing unit (NPU) comprising a primary processing node comprising primary control registers, and a plurality of processing nodes each comprising secondary control registers, the method comprising:

transmitting first control data from the primary processing node to a given secondary control register of each of the plurality of processing nodes; and
processing input data using the plurality of secondary processing nodes in accordance with the first control data transmitted to the given secondary control registers.

14. The method of claim 13, comprising setting an indicator to a first state to enable broadcasting of the first control data from the primary processing node to the given secondary control registers.

15. The method of claim 14, comprising:
setting the indicator to a second state to disable broadcasting of second control data from the primary processing node; and
selectively transmitting the second control data from the primary processing node to a secondary control register of one of the secondary processing nodes in response to the indicator being in the second state.

16. The method of claim 15, comprising:
setting the indicator to a third state; and
broadcasting third control data from the primary processing node to a secondary control register of a subset of the plurality of secondary processing nodes in response to the indicator being in the third state.

17. The method of claim 13, comprising writing the first control data to a given primary control register of the primary processing node when the first control data is transmitted to the given secondary control registers.

18. The method of claim 13, wherein the given secondary control register of each secondary processing node is contained within a respective first register bank comprising a plurality of secondary control registers, the method comprising:
transmitting second control data from the primary processing node to a respective second control register within a respective second register bank of each secondary processing node while said secondary processing node processes data in accordance with the first control data,
wherein the transmitting of the first control data to the given secondary control registers comprises the secondary processing nodes routing the first control data to the respective first register banks, and the transmitting of the second control data to the further secondary control registers comprises the secondary processing nodes routing the second control data to the respective second register banks.

19. The method of claim 13, wherein the input data comprises a portion of an input feature map, the method comprising simultaneously processing, using the secondary processing nodes, the portion of the input feature map in accordance with the first control data to generate respective different portions of an output feature map, the respective different portions corresponding to respective different depth slices of the output feature map.

20. A computer system comprising memory circuitry, a central processing unit (CPU), and a neural processing unit (NPU) connected to the memory circuitry and the CPU by a system bus, wherein the NPU comprises:
a primary processing node comprising primary control registers and processing circuitry configured to write control data to the primary control registers;
a plurality of secondary processing nodes each comprising respective secondary control registers and being configured to process data retrieved from the memory circuitry in accordance with control data stored by the respective secondary control registers; and an NPU bus interface for transmitting data between the primary processing node and the plurality of secondary processing nodes, wherein the primary processing node is configured to transmit first control data to a given secondary control register of each of the plurality of secondary processing nodes.

* * * * *